A. B. KOKERNOT.
HAT PIN.
APPLICATION FILED FEB. 27, 1912.
1,066,288.
Patented July 1, 1913.
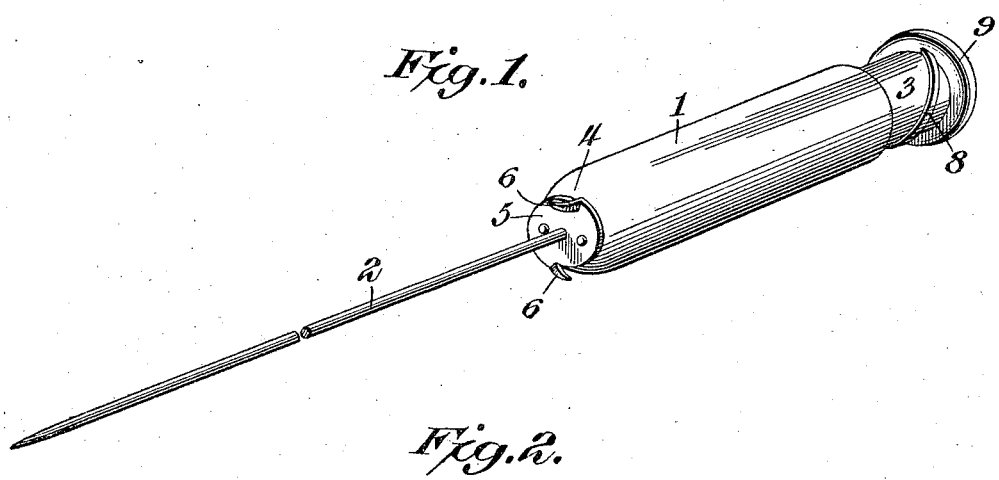
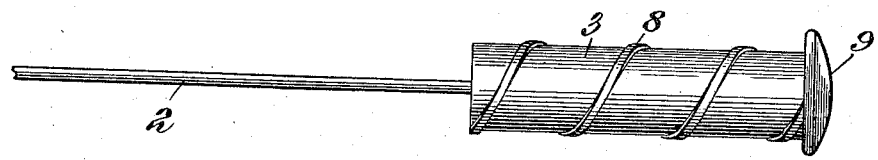
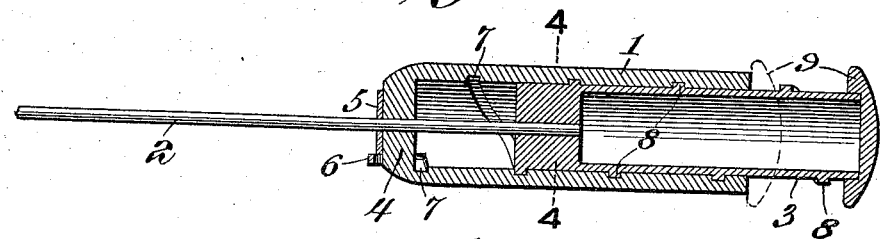
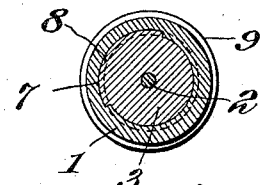
WITNESSES
Howard D. Orr.
F. T. Chapman
A. B. Kokernot, INVENTOR,
BY E. G. Siggers
ATTORNEY

UNITED STATES PATENT OFFICE.

ALEXANDER B. KOKERNOT, OF NEW ORLEANS, LOUISIANA.

HAT-PIN.

1,066,288. Specification of Letters Patent. Patented July 1, 1913.

Application filed February 27, 1912. Serial No. 680,209.

*To all whom it may concern:*

Be it known that I, ALEXANDER B. KOKERNOT, a citizen of the United States, residing at New Orleans, in the parish of Orleans and State of Louisiana, have invented a new and useful Hat-Pin, of which the following is a specification.

This invention has reference to improvements in hat pins, and its object is to provide a hat pin of extreme simplicity wherein the degree of projecting of the shank of the pin may be regulated at will, so that the pin is readily adapted to hats of different diameters, either where the point of the pin shank pierces the wall of the hat remote from that at which the pin is introduced or whether the point of the shank of the pin simply engages the inner wall of the hat in cases where the hat is provided with a resisting medium to engage the point of the pin shank, while at the same time provision is made for securing the head of the pin to the wall of the hat initially pierced by the pin shank.

The invention comprises a pin having a head member and a shank member, the shank member being carried by a manipulating part designed to be contained wholly or partially within the head member and introducible into the head member from the end thereof remote from that end designed to lock to the hat. The adjustment of the shank member with relation to the head member is brought about by the employment of a long pitch screw having coacting parts on the carrier for the pin shank, and the interior of the pin head, respectively.

The invention will be best understood from a consideration of the following detailed description, taken in connection with the accompanying drawings forming a part of this specification, with the further understanding that while the drawings show a practical embodiment of the invention, it is susceptible of other practical embodiments so long as such embodiments mark no material departure from the scope of the invention.

In the drawings:—Figure 1 is a perspective view of a pin embodying the present invention, with the shank member partially telescoped into the head member. Fig. 2 is a side elevation of the shank member and the carrier therefor, designed to be introduced into the head member. Fig. 3 is a longitudinal section of the pin with the pointed end of the shank member broken away and the shank partially telescoped within the head. Fig. 4 is a section on the line 4—4 of Fig. 3.

Referring to the drawings there is shown a head member 1 and a shank member 2, the latter being mounted in a carrier 3 adapted to the interior of the head member, which is hollow and closed at one end by a wall 4, the other end being open. The end or wall 4 has a central passage for the shank 2 of the pin, and on the exterior surface of the wall 4 there is secured a plate 5 with diametrically opposite prongs 6 formed thereon and so disposed that by a twisting action of the head in one direction the prongs may be made to enter the material of the hat to lock thereinto and be readily released from the hat by a reverse twisting movement of the head. Within the head there is formed in the inner wall thereof from the open end to the closed end of the head a helical groove 7, while on the carrier 3 there is formed a helical rib 8 of like pitch to the groove 7, but the pitch both of the groove 7 and rib 8 is long, so that by a single turn of the carrier it may be made to progress along the head within the same for a considerable distance. The male portion of the screw is shown as formed on the carrier 3 with the female portion on the interior of the head 1, but it will be understood that the reverse may be the case, although the arrangement shown is to be preferred.

At that end of the carrier 3 remote from the shank 2 the carrier is provided with a manipulating cap member 9 which, when the pin shank is in the full projected position, engages the end of the head 1 remote from that traversed by the shank 2, and this cap is made of such diameter as to be readily grasped by the fingers of the user. Moreover, the carrier 3 is made to have a snug fit in the head 1, so that it will retain the position to which it may be adjusted by friction. The same idea may be brought about by splitting the head longitudinally, so that when the carrier 3 is introduced the head will be slightly expanded, and by its elasticity will grasp the carrier sufficiently to prevent accidental displacement thereof, but not sufficiently to prevent purposely applied forces tending to screw the carrier into or out of the head. For purposes of lightness the carrier 3 may be made hollow, as shown, but this is not at all mandatory.

When the carrier 3 has been screwed into the head 1 until further movement is arrested by the engagement of the cap 9 with the corresponding end of the head 1, the pin 2 is projected to the greatest extent, and then the pin may be introduced into the hat and secured thereto by a twisting action of the head, bringing the prongs 6 into intimate relation with the fabric of the hat. Suppose, however, that it is desirable to have the shank effectively shorter than its full length, then the carrier 3 is rotated, thereby moving the shank 2 telescopically into the head 1, since the cap end of the carrier moves axially away from the corresponding end of the head, the carrier being unscrewed with relation to the head for a corresponding distance, and the shank 2 is drawn into the head correspondingly, it being understood that the shank is at the end remote from its point made fast to the carrier 3 to participate in the movements of the latter. The adjustment of the pin shank and carrier may be made at any time, whether the head be fast to the hat or not, and all adjustments may be made prior to the introduction of the pin into the hat if so desired. The long pitch, snugly fitting screw carrier for the shank provides a means whereby the adjustments are made rapidly and readily, and the parts will maintain the adjusted positions without danger of changing such positions under ordinary conditions of use.

The pin when assembled comprises but two separate parts, one being the head and the other the carrier 3 with the shank 2 fixed thereto. All springs, catches and the like are wholly eliminated.

What is claimed is:—

1. A hat pin comprising an elongated head member having means at one end for securing it to a hat, a shank member projecting through that end of the head member having the hat engaging means, and an elongated carrier for the shank member fast thereto and adapted to the interior of the head member and projecting through and beyond that end of the head member remote from the hat engaging means, the said carrier and the head member having coacting widely spaced screw threads of long pitch for causing telescoping movements of the carrier and shank member with reference to the head member on imparting rotative movements to said carrier.

2. A hat pin comprising an elongated hollow head member open at one end, an elongated carrier conforming to and fitting the interior of the head member and of a length to project through the open end of the head member and there provided with manipulating means, and a pin shank of less diameter than the carrier and fast within the head member to that end of the carrier remote from the manipulating means, the shank member projecting through the head member at the end remote from the open end and the outer wall of the carrier, and the inner wall of the head member being provided with coacting screw means for causing movement of the pin shank and carrier longitudinally of the head member on imparting rotative movement to the carrier.

3. A hat pin comprising a head member, with locking means at one end for engaging a hat to secure the head member thereto, said head member being open at the end remote from the locking means, a carrier adapted to the interior of the head member, and a pin shank fast to the carrier and projecting through the end of the head member provided with locking means, the carrier and interior of the head member being provided with coacting screw means for causing the movement of the pin shank and carrier longitudinally of the head member on imparting rotative movement to the carrier, the said carrier being provided at the end remote from the pin shank with a manipulating cap adapted to engage the open end of the head member when the pin shank is in the position of greatest projection with reference to the head member.

4. A hat pin comprising an elongated hollow head having a cylindrical interior, a pin shank movable telescopically with relation to the head member, and a cylindrical carrier for the pin shank adapted to the cylindrical interior of the head member with one end projecting beyond that end of the head member remote from the end entered by the pin shank, the carrier and the head member having widely spaced coacting screw threads of long pitch on their respective outer and inner walls and engaging frictionally to hold the carrier in adjusted positions against accidental displacement.

5. A hat pin comprising a hollow head member having one end closed and the other end open and at the closed end provided with means for locking the head member to a hat, a shank member entering the head member through the closed end, and a carrier for the shank of the pin and to which the shank of the pin is made fast, said carrier being of substantially the length of the internal bore of the head member and provided with a manipulating cap at the end remote from that to which the pin shank is secured, said carrier being provided with external screw threads of long pitch, and the interior of the head member being provided with screw grooves adapted to receive the threads of the carrier, the parts being related to maintain the carrier in different positions of adjustment with reference to the head member.

In testimony, that I claim the foregoing as my own, I have hereto affixed my signature in the presence of two witnesses.

ALEXANDER B. KOKERNOT.

Witnesses:
H. Y. CRAWFORD,
J. LEHMANN.

Copies of this patent may be obtained for five cents each, by addressing the "Commissioner of Patents, Washington, D. C."